United States Patent [19]

Bowling

[11] Patent Number: 5,623,979
[45] Date of Patent: *Apr. 29, 1997

[54] CUTTING TOOTH

[76] Inventor: John M. Bowling, 9376 Lincoln Way East, Orrville, Ohio 44667

[*] Notice: The term of this patent shall not extend beyond the expiration date of Pat. No. 5,497,815.

[21] Appl. No.: 607,826

[22] Filed: Feb. 27, 1996

Related U.S. Application Data

[63] Continuation of Ser. No. 306,571, Sep. 15, 1994, Pat. No. 5,497,815.

[51] Int. Cl.$^6$ .................................................. B27G 13/04
[52] U.S. Cl. ...................... 144/241; 144/24.12; 144/218; 144/235; 144/334; 407/118
[58] Field of Search .................................. 144/24.12, 218, 144/235, 236, 240, 241, 334; 175/432; 299/88, 89, 91, 93, 94, 95; 407/102, 113, 115, 118, 119

[56] References Cited

U.S. PATENT DOCUMENTS

| | | |
|---|---|---|
| Re. 28,651 | 12/1975 | Welborn . |
| 1,646,813 | 10/1927 | Davey et al. |
| 3,570,566 | 3/1971 | McCrery . |
| 3,797,544 | 3/1974 | Ver Ploeg . |
| 3,935,887 | 2/1976 | Van Zante et al. . |
| 4,759,394 | 7/1988 | Clemenson . |
| 4,827,995 | 5/1989 | Wilson . |
| 4,974,649 | 12/1990 | Manning . |
| 4,998,574 | 3/1991 | Beach et al. . |
| 5,005,622 | 4/1991 | Beach et al. . |
| 5,042,733 | 8/1991 | Hench . |
| 5,063,731 | 11/1991 | Hull et al. . |
| 5,135,035 | 8/1992 | Mills . |
| 5,183,089 | 2/1993 | Norlander et al. . |
| 5,201,352 | 4/1993 | Hult . |
| 5,203,388 | 4/1993 | Bowling . |
| 5,269,355 | 12/1993 | Bowen . |
| 5,279,354 | 1/1994 | LeMaux et al. . |
| 5,289,859 | 3/1994 | Minton, Jr. et al. . |
| 5,365,986 | 11/1994 | Hooser . |
| 5,497,815 | 3/1996 | Bowling .................. 144/241 |

*Primary Examiner*—W. Donald Bray
*Attorney, Agent, or Firm*—Oldham & Oldham Co., LPA

[57] ABSTRACT

A cutting tooth for use in a stump cutting apparatus wherein the cutting tooth comprises a mounting base and a head portion which are integral with one another and are made of a one-piece metallic forging. The forging is preferably made from AMS 4140 steel and the cutting tooth further comprises a cutting tip, preferably of tungsten carbide, which is fixedly attached to the head portion of the tooth. The disclosed preferred embodiments include those in which the head portion is disposed in a substantially straight line relationship with the mounting base and those in which the head portion is curved relative to the mounting base. The disclosed embodiments of the cutting teeth are suitable for attachment in matched pairs to a vertical, rotatable disk, or cutting wheel of the stump cutting apparatus, with the head portions being curved relative to the corresponding base portions so as to curve away from the disk, or, alternatively, disposed in a substantially straight line relationship with the corresponding base portion.

18 Claims, 4 Drawing Sheets

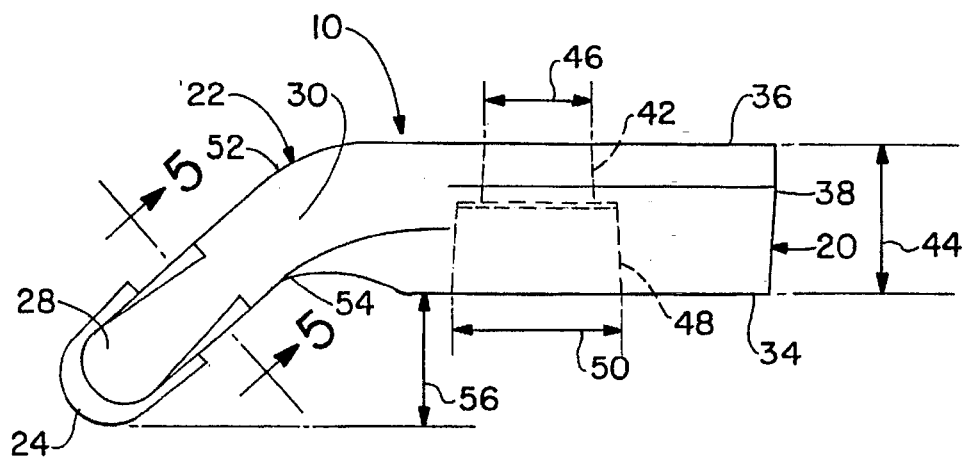
FIG.-3
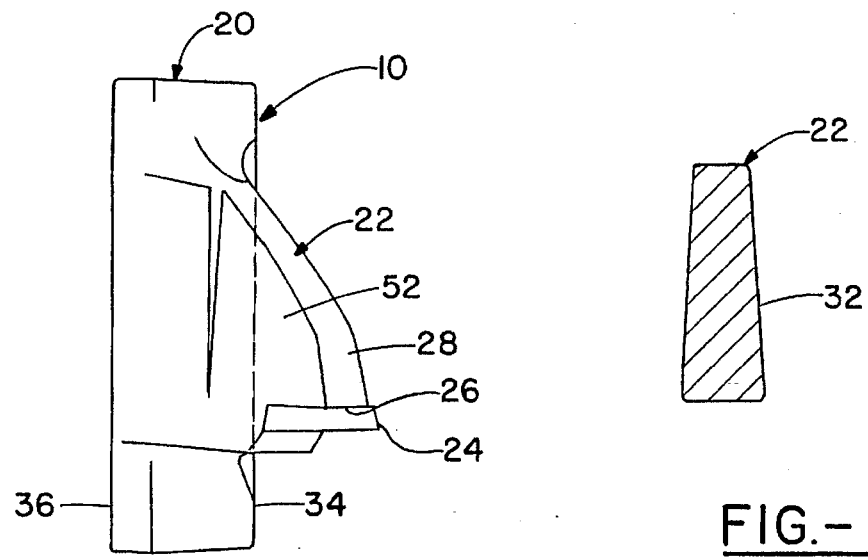
FIG.-4
FIG.-5
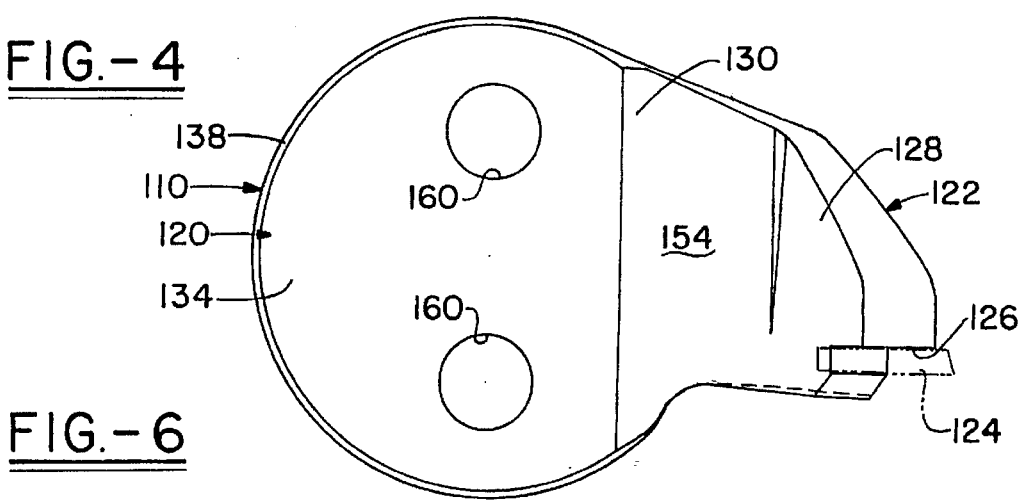
FIG.-6

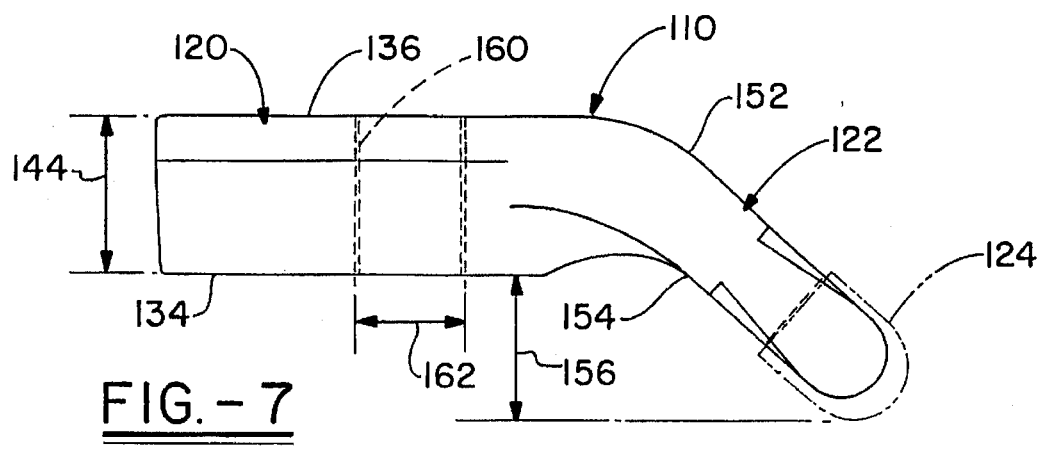
FIG.-7
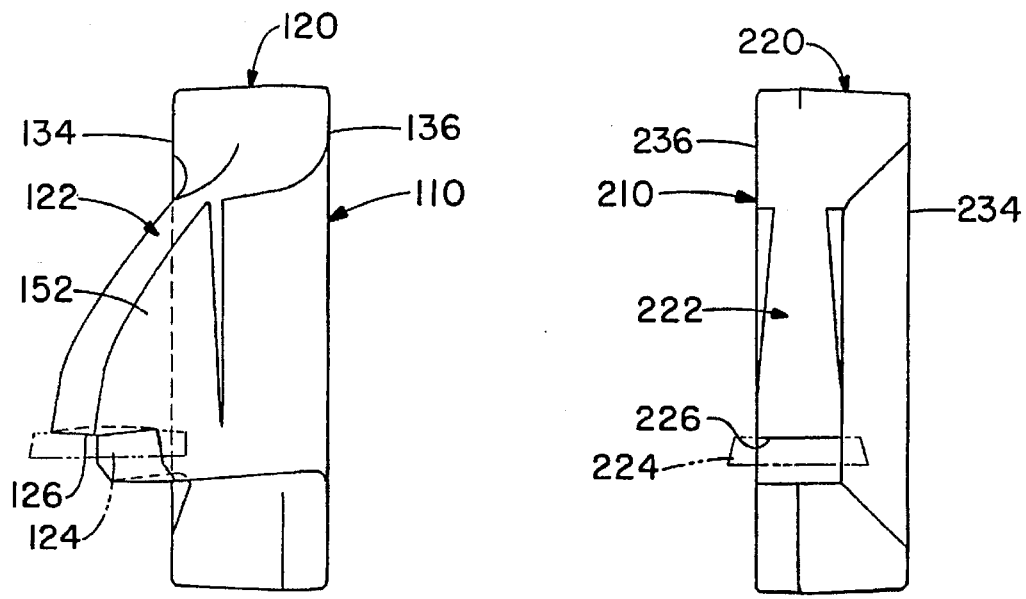
FIG.-8
FIG.-11
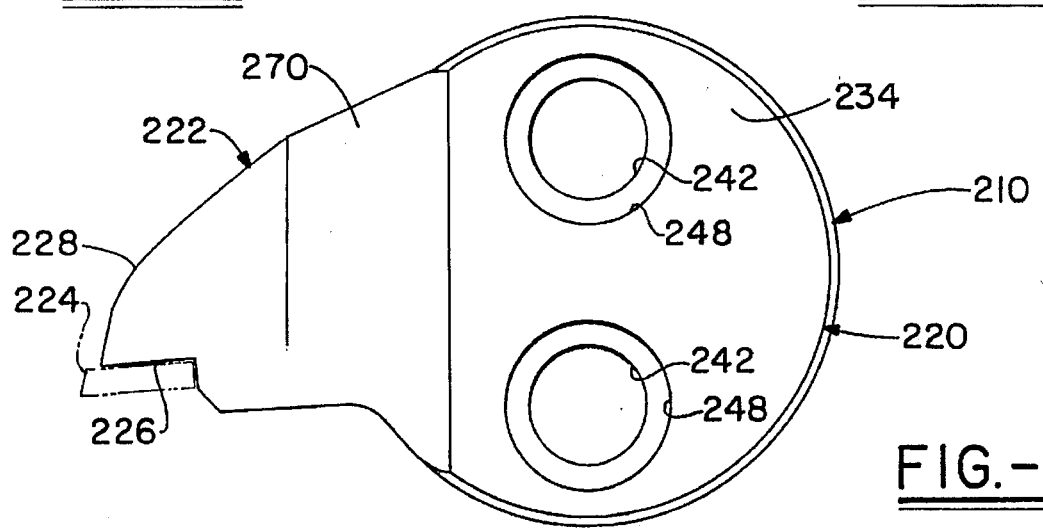
FIG.-9

CUTTING TOOTH

This is a continuation of application Ser. No. 08/306,571 filed on Sep. 15, 1994, U.S. Pat. No. 5,497,815.

BACKGROUND OF THE INVENTION

1.0 Field of the Invention

The present invention relates generally to a cutting tooth and, more particularly, to a cutting tooth for use in a stump cutting apparatus.

2.0 Related Art

Tree stump cutting devices are well known and widely used and typically include a rotatable, vertical cutting disk and a plurality of cutting bits, or cutting teeth, mounted about the periphery of the disk, with the teeth extending radially beyond the disk periphery. Additional cutting bits may also be mounted on radially inward portions of the disk in a variety of patterns. Known devices typically include cutting bits which are mounted in pairs at any given location, on opposing sides of the disk, by a pair of mount blocks, or pockets, which are separate from the cutting bits. The cutting bits typically include a head portion which includes a carbide cutting tooth and a shank portion, of a generally parallelepiped shape, which is received by a channel having a complementary shape in a corresponding mount block. Typically, a pair of conventional fasteners are inserted through mating holes in a first mount block, the cutting disk, and an opposing mount block with the fasteners conventionally retained. The shank portion of the cutting bits are typically sized so as to extend beyond the channel, transverse to the disk mounting surface, so as to place a generally rectangular surface of the shank portion in abutting relationship with the disk mounting surface. The fasteners are torqued with the resulting frictional forces between the shank and the disk intended to retain the cutting bit within the mount block. The cutting bits are typically made of a hardened steel with the cutting disk made of a relatively softer, more malleable steel. The head portion of the cutting bit may be formed in a generally straight line relationship with the shank, or may be curved and twisted relative to the shank so that the head portion curves away from the cutting disk when installed. Cutting bits and the corresponding, separate mount blocks of the general type just described are disclosed in the following U.S. Pat. No. 3,797,544 to Ver Ploeg, issued Mar. 19, 1974; U.S. Pat. No. 3,935,887 to Van Zante et al, issued Feb. 3, 1976; U.S. Pat. No. 4,759,394 to Clemenson, issued Jul. 26, 1988; U.S. Pat. No. 4,998,574 to Beach et al, issued Mar. 12, 1991; U.S. Pat. No. 5,135,035 to Mills, issued Aug. 4, 1992; U.S. Pat. No. 5,279,345 to LeMaux et al, issued Jan. 18, 1994.

Although cutting bits and mount blocks of the general type disclosed in the foregoing patents have been widely used in the industry, they are subject to one or more of the following problems. The cyclic loading of the cutting bit caused by the carbide tip contacting the stump may cause a failure in the shank portion at the interface with the head portion, due to the relatively small cross-sectional area of the shank portion as compared to that of the head portion at the interface. These cyclic loads, as well as the more infrequent but significantly more severe loads caused by the cutting bit striking a hard object such as a nail or a rock contained within the stump, may cause the shank to twist or rock about the longitudinal axis of the shank so that the relatively hard shank digs into the relatively soft cutting disk so as to leave a permanent impression in the disk. The normal clamp load forcing the shank against the disk may also create a permanent impression in the disk over time, due to the relatively high contact stresses caused by the relatively small contact area of the shank. The twisting or rocking action of the shank within the mount block channel may also cause one or both of the mount bolts to permanently stretch so as to reduce the joint clamp load. Either the permanent depression in the cutting disk, the bolt stretching, or a combination of both may cause the cutting bit shank to become loose within the mount block channel to the extent that the shank is liberated from the channel. This is known to have occurred notwithstanding the use of cutting bit retaining means of the general type illustrated by the shank portion recess 62 and mating pin 84 formed in the cutting bit 10 and half member 14 or 16 of mount block 12, respectively, disclosed in U.S. Pat. No. 4,998,574.

Another problem which has been observed with the general type of cutting bits and mount blocks disclosed in the aforementioned patents is that the distance from the carbide cutting tooth to the mount block surface opposite that which is adjacent the cutting disk, as measured in a direction substantially transverse to the disk lateral surface, is insufficient to allow uncut material such as small rocks, as well as cut debris to freely pass rearward by the mount block. Consequently, the uncut material and cut debris has been known to abrade the outer surface of the mount block, as well as the bolt heads inserted into the mount blocks. After a period of operation of the stump cutting device, several of the mount blocks and associated bolt heads may be abraded in this manner. Subsequently, one or more mount blocks may be replaced due to excessive abrasion. The new, replacement mount blocks may be significantly heavier than the remaining, abraded mount blocks on the cutting wheel of the stump cutting device. The increased mass of the new, replacement mount blocks has been known to create vibration problems with existing stump cutting devices.

Yet another problem with known cutting tips and mount blocks is proper alignment of the cutting tip shank within the corresponding mount block channel, so as to position the cutting tip at the desired radial location on the cutting wheel of the stump cutting device. This alignment procedure is relatively time consuming and therefore costly, and is subject to error.

In view of the foregoing deficiencies associated with known cutting bits and the associated and separate mounting blocks, applicant's invention is herein presented.

SUMMARY OF THE INVENTION

Accordingly, the present invention is directed to a cutting tooth for use in a stump cutting apparatus. In a preferred embodiment, the cutting tooth comprises a mounting base and a head portion which are integral with one another and are made of a one-piece metallic forging.

In other preferred embodiments of the present invention, the cutting tooth may comprise the following additional structural features and functions. The metallic forging may be made from AMS 4140 steel and the cutting tooth further comprises a cutting tip which is fixedly attached to the head portion. The cutting tip is preferably made of tungsten carbide and is preferably soldered to a milled seat formed on the head portion.

The mounting base includes first and second substantially flat lateral surfaces which are spaced apart and are substantially parallel to one another, and an edge surface interconnecting the two lateral surfaces and forming a perimeter, shaped as a partial circle, of the mounting base.

In one set of preferred embodiments which are disclosed, the head portion is disposed in a substantially straight line relationship with the mounting base. In at least one of these embodiments, the mounting base includes a plurality of tapped holes extending through a thickness of the base from the first lateral surface to and through the second lateral surface of the base, with each tapped hole being capable of accepting a fastener. The tapped holes are substantially perpendicular to the first and second lateral surfaces of the mounting base. In another one of these embodiments, the mounting base includes a plurality of clearance holes formed in a first one of the base lateral surfaces and extending partially through a thickness of the base toward the second lateral surface, and a plurality of counterbores formed in the second lateral surface and extending partially through a thickness of the mounting base so as to intersect a corresponding one of the clearance holes. The clearance holes and counterbores are generally circular, with the counterbores having a larger diameter than the clearance holes. Each counterbore is effective for receiving a head portion of a fastener of the stump cutting apparatus, used to mount the corresponding cutting tooth, and each clearance hole is effective for receiving a shank portion of the corresponding fastener.

In another set of preferred embodiments, the head portion is curved relative to the mounting base. Separate embodiments are disclosed with the mounting base having a plurality of tapped holes, or a plurality of clearance holes and counterbores as discussed previously with respect to the embodiments having the mounting base and head portion in a substantially straight line relationship. Additionally, in this set of embodiments the cutting tooth may comprise the following additional structural features and functions. The head portion includes a convex lateral surface which interfaces with one of the first and second lateral surfaces of the mounting base and a concave lateral surface which interfaces with the other of the lateral surfaces of the mounting base. The cutting tip extends laterally beyond one of the lateral surfaces of the mounting base, opposite that which is adjacent the cutting wheel of the stump cutting apparatus, by a clearance distance which extends substantially perpendicular to the mounting base lateral surface. The clearance distance is sized so as to minimize abrading of the mounting base caused by debris cut by the stump cutting apparatus, which passes by the cutting tooth during operation of the stump cutting apparatus.

In both sets of preferred embodiments the head portion includes a proximal end integral with the mounting base and a distal end which supports the cutting tip, with the head portion having a generally snout-like shape. The distal end includes a generally trapezoidal cross-section which converges away from the cutting tip.

BRIEF DESCRIPTION OF THE DRAWINGS

The structural features and functions of the present invention, as well as the advantages derived therefrom, will become apparent from the subsequent detailed description of the preferred embodiments when taken in conjunction with the accompanying drawings wherein:

FIG. 3 is a top view further illustrating the cutting tooth shown in FIG. 2;

FIG. 4 is a front elevational view further illustrating the cutting tooth shown in FIG. 2;

FIG. 5 is a cross-sectional view taken along line 5—5 in FIG. 3;

FIG. 6 is a side elevational view illustrating a cutting tooth of the present invention, generally corresponding to another of the embodiments illustrated in FIG. 1;

FIG. 7 is a top view further illustrating the cutting tooth shown in FIG. 6;

FIG. 8 is a front elevational view further illustrating the cutting tooth shown in FIG. 6;

FIG. 9 is a side elevational view illustrating the cutting tooth of the present invention according to a second preferred embodiment;

FIG. 11 is a front elevational view further illustrating the cutting tooth shown in FIG. 9.

DETAILED DESCRIPTION OF THE DRAWINGS

Figure 1:
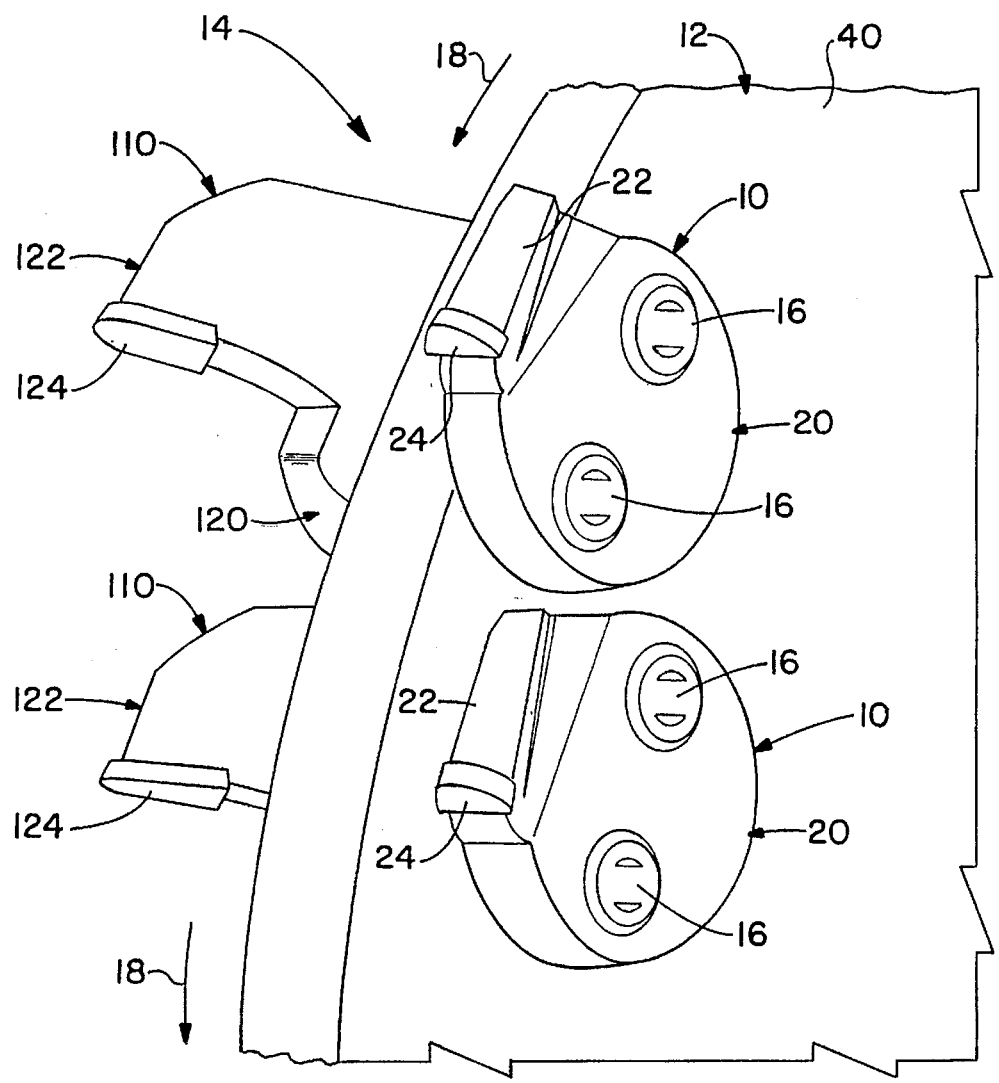
FIG. 1 is a partial perspective view illustrating the cutting tooth of the present invention according to two preferred embodiments, attached to a vertical, rotatable cutting wheel of a tree stamp cutting apparatus.

Referring now to the drawings, wherein like reference numerals have been used for similar elements throughout, FIG. 1 is a perspective view illustrating the cutting tooth of the present invention according to first and second preferred embodiments 10 and 110, respectively, which are attached in matching pairs to a vertical, rotatable disk, or cutting wheel 12 of a tree stump cutting apparatus 14 (not shown in its entirety) using conventional fasteners 16. The heads of fasteners 16 may preferably include a hexagonal shaped recess (not shown) for accepting a conventional torquing device. Disk 12 is rotatably supported on stump cutting apparatus 14 and in operation rotates in a counterclockwise direction as viewed in FIG. 1 as depicted by arrow 18. An arm (not shown) of stump cutting apparatus 14 is movable in a vertical as well as horizontal direction to position the wheel 12 for a cut. The stump cutting apparatus 14 is positioned such that the cutting teeth on one side only of wheel 12, and then the other engage a surface of the stump to be cut, with disk 12 being moved laterally so as to cut a path across the stump, with the cutting action produced by the teeth 10 and 110 as described in greater detail subsequently.

Referring now to FIGS. 2–5, the specific construction of the cutting tooth 10 will be discussed with the general features described herewith applicable to the various other embodiments of the present invention. Tooth 10 includes generally a mounting base 20 and a head portion 22. A central feature of the present invention is that mounting base 20 and head portion 22 are integral with one another and are made of a one-piece construction preferably comprising a metallic forging or casting. In a preferred embodiment, a metallic forging is made from AMS 4140 steel, but other metallic alloys, having suitable mechanical properties, are envisioned to be within the scope of the present invention. Forging is currently preferred over casting due to the ability of producing a tooth of superior strength and durability. The advantages which are derived from manufacturing tooth 10 as a one-piece forging including mounting base 20 and head portion 22 avoid the deficiencies of prior cutting teeth noted in the Background of the Invention, as subsequently discussed.

Figure 2:
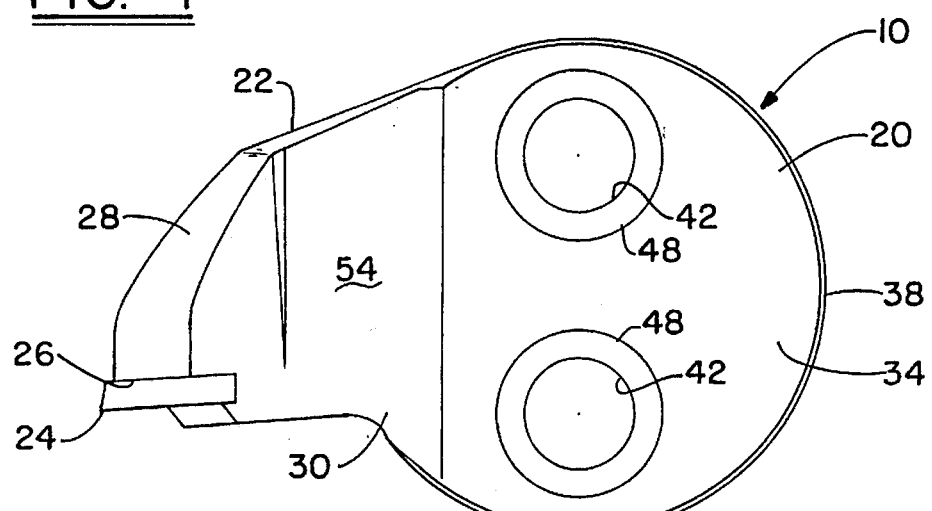
FIG. 2 is a side elevational view illustrating the cutting tooth of the present invention according to a first preferred embodiment, generally corresponding to one of the embodiments illustrated in FIG. 1.

Cutting tooth 10 further includes a cutting tip 24 which is fixedly attached to head portion 22. Cutting tip 24 is preferably made of tungsten carbide but alternatively, may be made of other metallic alloys having comparable hardness and mechanical strength. Head portion 22 includes a seat 26 which is milled in an inner surface of a distal end 28 of head portion 22. Cutting tip 24 is preferably soldered to seat 26 so that distal end 28 supports tip 24. Alternatively, cutting tip 24 may be attached to seat 26 with known industrial adhesives, or may be welded or brazed to seat 26. Head portion 22 further includes a proximal end 30 which is integral with mounting base 20 and, as shown in FIGS. 2–4, head portion 22 has a generally snout-like shape.

As shown in FIGS. 4 and 5, distal end 28 of head portion 22 includes a generally trapezoidal cross-section 32 which is incorporated to streamline head portion 22 so as to reduce the resistance of tooth 10 as it cuts through the stump. The cross-section 32 converges in an outward direction away from cutting tip 24.

Referring now to FIG. 3, mounting base 20 includes substantially flat lateral surfaces 34 and 36 which are spaced apart and are substantially parallel to one another. Base 20 further includes an edge surface 38 extending between and interconnecting lateral surfaces 34 and 36. Surface 38 forms a perimeter of base 20 which is shaped as a partial circle. When cutting tooth 10 is installed on stump cutting apparatus 14, lateral surface 36 is in contacting relationship with lateral surface 40 (shown in FIG. 1) of cutting wheel 12. Base 20 further incudes a pair of spaced apart clearance holes 42 which are substantially perpendicular to and formed in lateral surface 36 and extend through a portion of a thickness 44 of base 20. Holes 42 are circular and have a diameter 46 which is sized so as to provide a small annular clearance around the shank portion of a conventional fastener passing through base 20. Mounting base 20 also includes a pair of counterbores 48 which are formed in lateral surface 34. Counterbores 48 are circular, having a diameter 50, and are substantially perpendicular to surface 34. Each counterbore 48 is concentric with a corresponding one of clearance holes 42 and extends partially through the thickness 44 of base 50 so as to intersect the corresponding clearance hole 42. As shown in FIG. 3, diameter 50 of counterbore 48 is larger than the diameter 46 of clearance holes 42, with counterbores 48 being effective for receiving the head portion of a mounting fastener, such as fastener 16 (shown in FIG. 1) used to attach tooth 10 to wheel 12 of stump cutting apparatus 14. Head portion 22 is curved relative to mounting base 20 so that head portion 22 extends away from disk 12 when tooth 10 is attached to disk 12. Head portion 22 includes a convex lateral surface 52 which interfaces with lateral surface 36 of mounting base 20, and a concave lateral surface 54 which interfaces with lateral surface 34 of mounting base 20.

The thickness 44 of cutting tooth 10 is significantly reduced relative to the separate mounting block, or pocket, of prior cutting bit/mounting block assemblies. This is made possible since mounting base 20 and head portion 22 are preferably made of a one-piece forging and therefore, unlike prior devices, mounting base 20 does not include a channel for accepting the shank portion of a separate cutting bit. Consequently, the thickness 44 of mounting base 20 may be determined based on considerations of strength required to react the loads due to cutting tip 24 contacting the stump, and to accommodate at least a portion of the head of fastener 16 which is recessed within counterbore 48 as well as a portion of the shank of fastener 16 which extends through clearance hole 42. With regard to subsequently discussed embodiments, having mounting bases incorporating tapped holes, a further consideration of the thickness of the corresponding mounting base is concerned with the required thread engagement of fasteners 16. A clearance distance 56, corresponding to a maximum distance between lateral surface 34 of mounting base 20 and cutting tip 24 as measured in a direction substantially perpendicular to surface 34, is therefore significantly increased relative to prior devices having the same or comparable spacing between cutting tip 24 and cutting wheel 12.

Referring now to FIGS. 6–8, a cutting tooth 110 is illustrated which is essentially a mirror image of tooth 10 and similar elements are indicated by reference numerals which are 100 greater than the corresponding elements of tooth 10. As with tooth 10, cutting tooth 110 includes a mounting base 120 and a head portion 122 which are integral with one another and are made of a one-piece construction comprising a metallic forging which is preferably made from AMS 4140 steel. Other than being formed as a mirror image relative to tooth 10, the only other structural difference between tooth 110 and tooth 10 is that tooth 110 includes a pair of spaced apart tapped holes 160 instead of a pair of clearance holes 42 and counterbores 48. Holes 160 extend completely through a thickness 144 of mounting base 120 and therefore extend through lateral surfaces 134 and 136 of base 120. Holes 160 are substantially perpendicular to surfaces 134 and 136 and are preferably tapped with a ⅝-18 UNF-2B thread so as to accept commonly used fasteners in the industry such as fasteners 16. However, it should be understood that other hole and thread sizes may be used. Holes 160 are tapped such that fasteners 16 may be inserted into holes 160 through the opening formed in lateral surface 136 and threaded into or through mounting base 120. Since tooth 110 is formed as a mirror image of tooth 10 and includes tapped holes, one tooth 10 and one tooth 110 may be mounted to disk 12 as a matched pair as shown in FIG. 1. Fasteners 16 are inserted through counterbores 48 and clearance holes 42 of tooth 10, through aligned holes (not shown) in disk 12, and into tapped holes 160 in tooth 110.

The stump cutting apparatus 14 typically includes a plurality of matched pairs of teeth such as 10 and 110 which are disposed about the periphery of disk 12 and may also be positioned at radially inward locations on disk 12 in a pattern which may comprise a somewhat helical shape. As shown in FIG. 1, the head portions 22 and 122 of each matched pair of teeth 10 and 110, respectively, are curved away from the cutting plane of disk 12 with the respective cutting tips 24 and 124 being disposed so that each tooth 10 and 110 provides a cutting action when disk 12 is rotated in direction 18.

Figure 10:
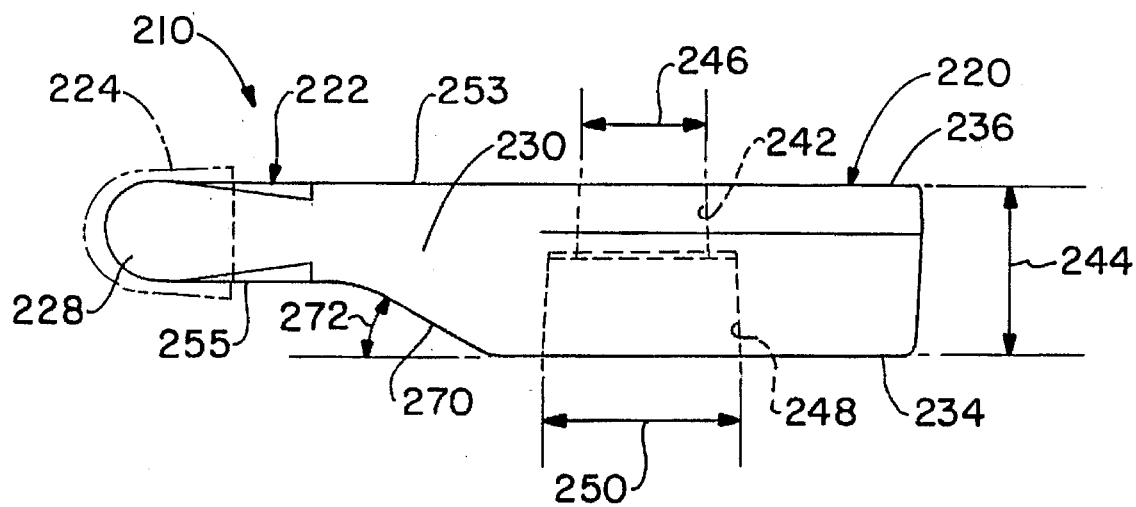
FIG. 10 is a top view further illustrating the cutting tooth shown in FIG. 9.

Referring now to FIGS. 9–11, a cutting tooth 210 is illustrated according to a second preferred embodiment of the present invention. Like cutting teeth 10 and 110, cutting tooth 210 includes a mounting base 220 and a head portion 222 which are integral with one another and are made of a one-piece construction comprising a metallic forging, which is preferably made from AMS 4140 steel. However, head portion 222 is not curved relative to mounting base 220, but instead is disposed in a substantially straight line relationship with base 220. As with prior embodiments, tooth 210 includes a cutting tip 224 which is supported by a distal end 228 of head portion 222, and is preferably soldered to a milled seat 226 formed in head portion 222. Head portion 222 further includes a proximal end 230 which is integral with mounting base 220 and lateral surfaces 253 and 255 which differ from the convex and concave lateral surfaces of the head portions of prior embodiments. The portion of lateral surface 253 in proximal end 230 is substantially co-planer with lateral surface 236 of mounting base 220. As with prior embodiments, proximal end 230 includes a generally trapezoidal cross-section. Lateral surface 255 of head portion 222 includes a portion 270 which forms an angle 272 relative to lateral surface 234 of mounting base 220 and provides a transition between mounting base 220 and the distal end 228 of head portion 222 which has a reduced thickness relative to thickness 244 of mounting base 220. When tooth 210 is installed on a stump cutting apparatus such as disk 12 of apparatus 14, lateral surface 236 is in contacting engagement with a surface of the disk. The fact that at least a portion of lateral surface 253 of head portion 222 is co-planer with surface 236, and that cutting tip 224 extends beyond the profile of head portion 222 is not a problem since tooth 210 is disposed adjacent the periphery of disk 12 such that tip 224 extends radially beyond disk 12. Cutting tooth 210 may be used in conjunction with a matching straight tooth, or alternatively may be used in conjunction with tooth 110. Tooth 210 is typically the radially outermost tooth on wheel 12 and as such is used to cut away material surrounding the stump to be cut, such as roots and soil, which may be encountered prior to the material cut by teeth 10 and 110. Additionally, it serves to define the total depth of the cut in the stump after each singular horizontal pass of cutting disk 12.

A mirror image of tooth 210 differs from tooth 210 in that clearance holes 242 and counterbores 248 of tooth 210 are replaced by a pair of tapped holes. As with holes 160, the holes are preferably tapped with a ⅝-18 UNF-2B thread diameter which is compatible with the size of counterbores 248 and clearance holes 242 in tooth 210, so as to accept commonly used fasteners in the industry such as fasteners 16.

The cutting teeth of both principal embodiments are used together on a cutting disk in a predetermined arrangement and are attached to cutting disk 12 of stump cutting apparatus 14 in matched pairs as follows. At a given desired location about the periphery, or a radially inward location of disk 12 a cutting tooth 10 and a cutting tooth 110 are disposed as a matched pair on opposite surfaces of disk 12. A pair of fasteners 16 are then inserted through counterbores 48 and clearance holes 42 in tooth 10, through aligned holes in disk 12, and are then threaded into tapped holes 160 of tooth 110, thereby clamping teeth 10 and 110 to disk 12. This is illustrated in FIG. 1, with teeth 10 being disposed in contacting engagement with surface 40 of disk 12 and matching teeth 110 in contacting engagement with the opposite surface of disk 12. Similarly, at a desired location, a tooth 210 is disposed in contacting engagement with surface 40 of disk 12 with a matching tooth, which is the mirror image of tooth 210, disposed in contacting engagement with the opposite surface of disk 12. Fasteners 16 are then inserted through counterbores 248 and clearance holes 242 in tooth 210, through aligned holes in disk 12 and threaded into tapped holes in the matching tooth, thereby clamping the teeth to disk 12. Alternatively, tooth 110 may be matched with tooth 210 and tooth 10 may be matched with the mirror image of tooth 210, at desired locations about the periphery of disk 12. The mass of teeth 10 and 110 are reasonably close to the mass of the substantially straight teeth, i.e., tooth 210 and the mirror image of tooth 210, so that vibration problems are minimized with such alternative matching of the teeth on disk 12. Further, it is within the scope of the present invention to mount a single one of any of the teeth embodiments disclosed to a first side of disk 12 with the tooth retained by a conventional fastener disposed on the opposite side of disk 12 or a low profile mount block disposed on the opposite side of disk 12, or a combination of both. Additionally, a single low profile block disposed on one side of disk 12 may be used to return a row of teeth disposed on the opposite side of disk 12. It should be understood that the mass of the conventional fasteners and/or mount blocks used in the aforementioned mounting arrangements is an important factor to be considered with respect to vibration problems.

In operation, as disk 12 of stump cutting apparatus 14 rotates in direction 18 shown in FIG. 1, cutting tips 24, 124, etc., cut the stump into chips. Substantially horizontal paths are cut across the stump as disk 12 is traversed in a direction substantially perpendicular to the disk lateral surfaces with the depth of the cut determined by the position of the perimeter of cutting wheel 12 and the radially outermost teeth mounted to wheel 12. With known devices, the disk 12 may also be moved up and down and relocated in a forward direction with additional cuts being made across the stump until the stump has been removed. (These features of the stump cutting apparatus do not form a part of the present invention.) Due to the one-piece construction of the teeth of the present invention the problem of cutting bit shanks rocking within the corresponding mount block channels of prior devices is eliminated. Consequently, a source of deformation of disk 12 is eliminated. Additionally, the one-piece construction of the teeth eliminates the potential problem of prior devices concerning the liberation of the cutting bit shanks from the corresponding mount block channels. The one-piece construction of the teeth also eliminates the cutting bit alignment problem associated with prior devices which may lead to inaccurate cutting tip locations. Further, the elimination of cutting bit adjustment time and the reduced number of parts required for a given stump cutting device result in reduced cost relative to prior cutting bit and mount block assemblies. The surface area of lateral surfaces of the corresponding base portions of the teeth are significantly larger than the surface area of the cutter bit shanks of prior devices. Accordingly, for a given clamp load attaching a pair of teeth to disk 12, the compressive surface stresses on disk 12 in the areas corresponding to contacting engagement with the cutting teeth is significantly lower than with prior devices, thereby further reducing the chance for permanent deformation of disk 12. The snout-like shape of the head portions of the teeth which taper from the distal end to the proximal end of each head portion provides increased strength at the interface with the mounting base and avoids the comparatively weak interface section of the head and shank portions of prior cutting bits. With respect to cutting teeth 10 and 110, clearance distances 56 and 156, respectively, are substantially greater than the corresponding dimensions of prior devices which significantly reduces the likelihood that the heads of fasteners 16 and lateral surfaces 34 and 134 of mounting bases 20 and 120, respectively, will be abraded by debris cut by teeth 10 and 110 or other material encountered by mounting bases 20 and 120 during the operation of the cutting wheel 12 of the stump cutting apparatus 14. The dynamic balance of cutting wheel 12 is conventionally maintained by the positioning of the teeth on wheel 12 and the generally consistent mass of the teeth. When one or more of the teeth become abraded, mass consistency varies from tooth to tooth which adversely effects the dynamic balance of wheel 12. The fact that cutting teeth of the present invention have a reduced profile, and consequently a reduced mass, relative to prior cutting bit and mount block assemblies, and the reduced likelihood of abrading the cutting teeth mounting bases reduces the frequency and severity of vibration problems experienced by the cutting wheel 12 of the stump cutting apparatus 14.

While the foregoing description has set forth the preferred embodiments of the invention in particular detail, it must be understood that numerous modifications, substitutions and changes can be undertaken without departing from the true spirit and scope of the present invention as defined by the ensuing claims. The invention is therefore not limited by the specific preferred embodiments as described but rather by the ensuing claims.

What is claimed is:

1. A one-piece cutting tooth for direct connection to a cutting wheel of a stump cutting apparatus, said cutting tooth comprising:

a mounting base including at least one substantially flat surface for contacting said cutting wheel, said mounting base having at least one bore formed therethrough to receive a fastener for connecting said cutting tooth to said cutting wheel;

a head portion integral with said mounting base; and a cutting tip fixedly attached to said head portion;

wherein said mounting base and said head portion are made of a one-piece metallic construction.

2. The cutting tooth as recited in claim 1, wherein said one-piece metallic construction is made from AMS 4140 steel.

3. The cutting tooth as recited in claim 1, wherein said fixedly attached cutting tip is permanently attached to said head portion.

4. The cutting tooth as recited in claim 3, wherein said cutting tip is made of tungsten carbide.

5. The cutting tooth as recited in claim 4, wherein:

said head portion includes a milled seat;

said tungsten carbide cutting tip is soldered to said seat.

6. The cutting tooth as recited in claim 3, wherein said mounting base includes:

first and second lateral surfaces which are spaced apart and are substantially parallel to one another;

an edge surface interconnecting said first and second lateral surfaces and forming a perimeter of said mounting base.

7. The cutting tooth as recited in claim 6, wherein said perimeter is shaped as a partial circle.

8. The cutting tooth as recited in claim 6, wherein at least one of said first and second lateral surfaces is substantially flat.

9. The cutting tooth as recited in claim 6, wherein said head portion is disposed in a substantially straight line relationship with said mounting base.

10. The cutting tooth as recited in claim 9, wherein:

said mounting base includes a plurality of tapped poles extending through a thickness of said mounting base from said first lateral surface to and through said second lateral surface, each of said tapped holes being capable of accepting a fastener;

said tapped holes are substantially perpendicular to said first lateral surface.

11. The cutting tooth as recited in claim 9, wherein said mounting base includes:

a plurality of clearance holes formed in one of said first and second lateral surfaces and extending through a first portion of a thickness of said mounting base toward the other of said first and second lateral surfaces; and a plurality of counterbores formed in the other of said first and second lateral surfaces and extending through a second portion of said thickness of said mounting base toward said one of said first and second lateral surfaces;

wherein each of said counterbores intersects a corresponding one of said clearance holes;

wherein said clearance holes and said counterbores are generally circular, said counterbores having a larger diameter than said clearance holes, each of said counterbores being effective for receiving a head portion of a fastener of the stump cutting apparatus, each of said clearance holes being effective for receiving a shank portion of the corresponding fastener of the stump cutting apparatus.

12. The cutting tooth as recited in claim 6, wherein said head portion is curved relative to said mounting base.

13. The cutting tooth as recited in claim 12, wherein:

said mounting base includes a plurality of tapped holes extending through a thickness of said mounting base from said first lateral surface to and through said second lateral surface, each of said tapped holes being capable of accepting a fastener;

said tapped holes are substantially perpendicular to said first lateral surface.

14. The cutting tooth as recited in claim 12, wherein said mounting base includes:

a plurality of clearance holes formed in one of said first and second lateral surfaces and extending through a first portion of a thickness of said mounting base toward the other of said first and second lateral surfaces; and a plurality of counterbores formed in the other of said first and second lateral surfaces and extending through a second portion of said thickness of said mounting base toward said one of said first and second lateral surfaces;

wherein each of said counterbores intersects a corresponding one of said clearance holes;

wherein said clearance holes and said counterbores are generally circular, said counterbores having a larger diameter than said clearance holes, each of said counterbores being effective for receiving a head portion of a fastener of the stump cutting apparatus, each of said clearance holes being effective for receiving a shank portion of the corresponding fastener of the stump cutting apparatus.

15. The cutting tooth as recited in claim 12, wherein said head portion includes:

a convex lateral surface which interfaces with one of said first and second lateral surfaces of said mounting base;

a concave lateral surface which interfaces with the other of said first and second lateral surfaces of said mounting base.

16. The cutting tooth as recited in claim 3, wherein said head portion includes:

a proximal end integral with said mounting base;

a distal end which supports said cutting tip;

wherein said head portion has a generally snout-like shape.

17. The cutting tooth as recited in claim 16, wherein said distal end has a generally trapezoidal cross-section which converges away from said cutting tip.

18. The cutting tooth as recited in claim 3, wherein:

said cutting tip extends laterally beyond a first lateral surface of said mounting base by a clearance distance extending substantially perpendicular to said first lateral surface;

said clearance distance is sized so as to minimize abrading of said mounting base caused by material encountered by said mounting base during operation of a cutting wheel of the stump cutting apparatus.

* * * * *